United States Patent [19]

Nesin et al.

[11] Patent Number: 4,796,280
[45] Date of Patent: Jan. 3, 1989

[54] DIGITAL DATA SEPARATOR

[75] Inventors: Richard Nesin, Sound Beach; Tak-po Li, Nesconset, both of N.Y.

[73] Assignee: Standard Microsystems Corporation, Hauppauge, N.Y.

[21] Appl. No.: 118,235

[22] Filed: Nov. 6, 1987

[51] Int. Cl.$^4$ .............................................. H04L 7/02
[52] U.S. Cl. ..................................... 375/110; 375/118
[58] Field of Search ............... 375/108, 110, 111, 118, 375/119, 120; 370/84, 85, 100

[56] References Cited

U.S. PATENT DOCUMENTS

| | | | |
|---|---|---|---|
| 4,472,818 | 9/1984 | Zapisek et al. | 375/110 |
| 4,551,845 | 11/1985 | Halden et al. | 375/108 X |
| 4,622,665 | 11/1986 | Jonsson et al. | 375/110 X |
| 4,715,049 | 12/1987 | Andrews et al. | 375/110 X |

Primary Examiner—A. D. Pellinen
Assistant Examiner—Derek S. Jennings
Attorney, Agent, or Firm—Hopgood, Calimafde, Kalil, Blaustein & Judlowe

[57] ABSTRACT

A data separator produces a reference clock from encoded data through the use of a digital logic that simulates the operation of an analog phase-locked loop. The digital phase-locked loop includes a counter oscillator that develops a period value which is incrementally modified in accordance with time variations in the new input data to maintain the regenerated data in proper phase relationship with the clock. The counter oscillator includes a zero-crossing counter which produces a reference clock signal to a clock and data regeneration circuit. The counter is incremented until its count is equal to the previously computed normal period value. This counter value is latched by a syncronized input data and represents the required period adjustment. As the data is syncronized with the reference clock the value of this adjustment approaches zero. The circuit also includes a digital low-pass filter that comprises a memory element that allows the new phase correction data to be added to the time-weighted previous period data.

4 Claims, 7 Drawing Sheets

DIGITAL DATA SEPARATOR

BACKGROUND OF THE INVENTION

The present invention relates generally to digital data processing, and more particularly to an improved digital data separator.

Digital data is conventionally stored on a floppy disk in one of several codes or formats. Self-clocking Manchester codes (FM, MFM, Biphase, MMFM, RLL 2,7 and the like) are widely used in data stored on disks, particularly in magnetic storage and data communications. The data coded in accordance with these and other codes contains both clock and data information in a common data stream. In order to utilize the data from the disk, a data separator is typically provided to separate the data from the clock and to provide separate data and clock signals for use by an external utilization device, such as a disk controller.

Because of the noise and jitter that typically occur in the data stream from the disk, and possible variations in the rotational speed of the floppy disk, the data separator must also be able to maintain synchronization between the reconstructed reference clock and the input data and to make necessary adjustments in the reference clock for variations in the frequency or period of the input data received from the disk so as to maintain the regenerated data pulsed in the middle of a half bit cell or data window. One widely used technique for separating data and developing a reference clock from the encoded data stream involves the use of an analog phase-locked loop. The analog circuits used in an analog phase-locked loop, however, are generally more expensive and less reliable than digital circuitry. For this reason attempts have been made in recent years to implement phase-locked loops for use in data separators that employ digital circuits and techniques. One prior approach to the digital implementation of a phase-locked loop is described in U.S. Pat. No. 4,472,818, which issued to John M. Zapisek and is assigned to the assignee of the present application.

Although the known digital data separators, such as the one described in the aforesaid patent, have proven to be successful in many applications, they generally require high clock rates in order to achieve acceptable performance, particularly with respect to accuracy and resolution. As a consequence of the requirement of a high clock rate, it is generally not cost effective to implement these known digital data separators in MOS integrated circuits. In addition, some of the known digital data separators compromise performance, such as bit jitter tolerance, to allow them to operate at a lower clock rate.

The conventional digital data separators typically correct the data in the data window to a best-case resolution of plus or minus one operating clock period. For this reason, the more accurate digital data separators employ both short-term (phase) and long-term (period) corrections to the data in order to achieve acceptable accuracy. The phase correction compensates for relatively fast data window distortions (such as bit jitter), whereas the period correction compensates for slow distortions (such as motor speed variation). Each of these corrections attempts to place the separated data pulse in the middle of the correct data window. These techniques, however, have several drawbacks relating to the slow clock speeds and the resultant poor resolution.

SUMMARY OF THE INVENTION

It is an object of the present invention to provide a digital data separator that resolves the problems present in the operation of the known data separators and which provides increased resolution and accuracy without requiring a correspondingly higher operating clock rate.

It is a further object of the present invention to provide a digital data separator which simulates the operation of an analog phase-locked loop.

It is another object of the present invention to provide a digital data separator of the type described that requires no external components and can operate reliably over a wide range of input data rates.

It is yet a further object of the present invention to provide a digital data separator which obviates the need for short-term correction for all but the highest data rates.

To these ends, the present invention provides a digital data separator which achieves improved resolution of the period correction by the use of a digital phase locked-loop that develops a period value for the reference clock that is incrementally modified in accordance with the new input data so as to position the regenerated data pulse in the middle of the data window or half bit cell. The digital phase-locked loop includes a zero-crossing oscillator including an up-down counter that is incremented by an internal clock until its output is equal to the normal period of the half bit cell. The count value in the up-down counter is latched by the next synchronized input data pulse and represents the value of the required period adjustment. The phase-locked loop circuit further includes a normal period adjuster and a digital low-pass filter that includes a memory element to remodel the time-weighted previous period data, and also includes a fractional period accumulator that provides a carry signal to the counter to improve resolution of the counter without requiring a higher operating clock.

BRIEF DESCRIPTION OF THE DRAWINGS

To the accomplishment of the above and such further objects as may hereinafter appear, the present invention relates to a digital data separator substantially as defined in the appended claims and as described in the following detailed specification, as considered in conjunction with the accompanying drawings in which:

DETAILED DESCRIPTION OF THE DRAWINGS

Figure 1:
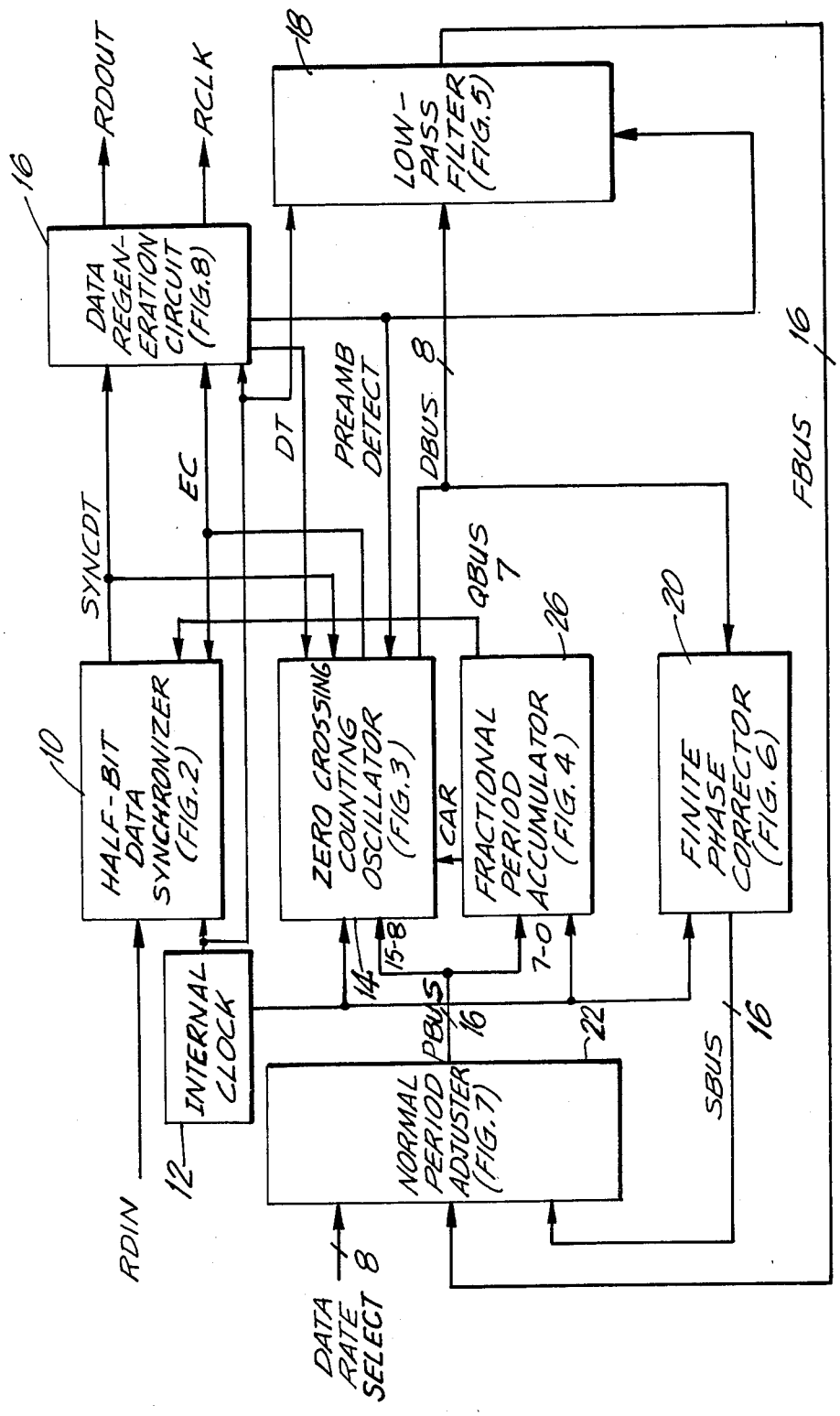
FIG. 1 is a schematic block diagram of a digital data separator in accordance with an embodiment of the present invention.
Figure 2:
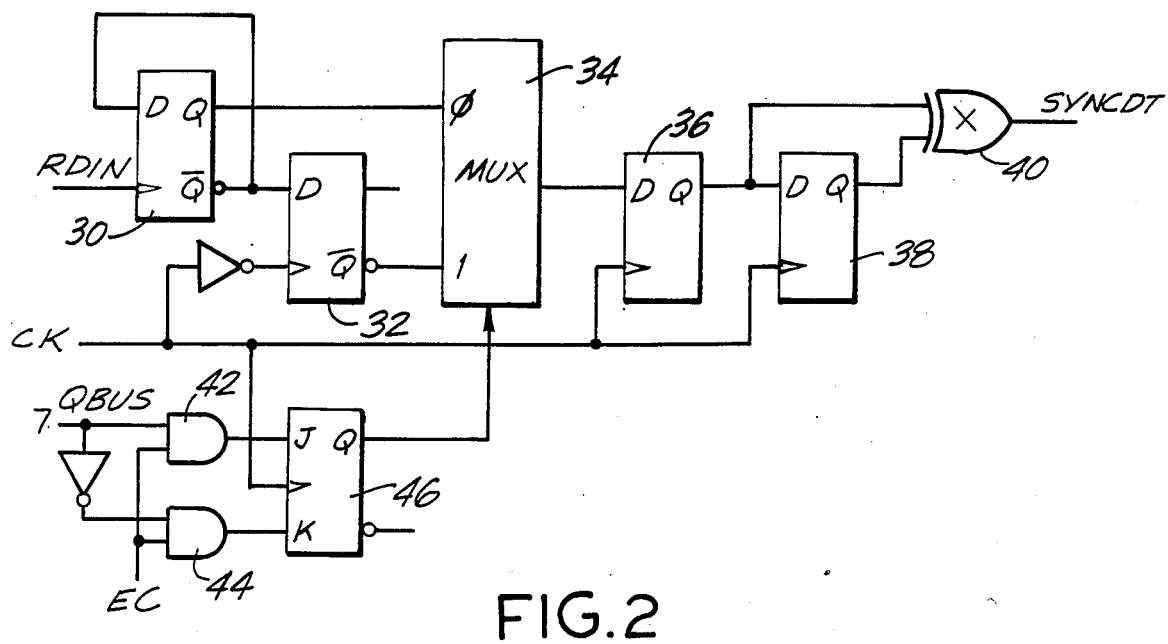
FIG. 2 is a schematic diagram of the half-bit data synchronizer of the data separator of FIG. 1.

The data separator of the present invention, as in the embodiment illustrated in FIG. 1, receives an encoded input data stream RDIN, such as from a floppy disk, at the input of a half-bit data synchronizer 10. The data may be encoded in one of the several Manchester codes and, as is per se conventional, includes both clock and data pulses in a common data stream. As described in greater detail with reference to FIG. 2, data synchronizer 10 generates a synchronized data SYNCDT pulse which is synchronous with an internal or master clock 12 for each data pulse from RDIN detected at the input of the data synchronizer.

Figure 3:
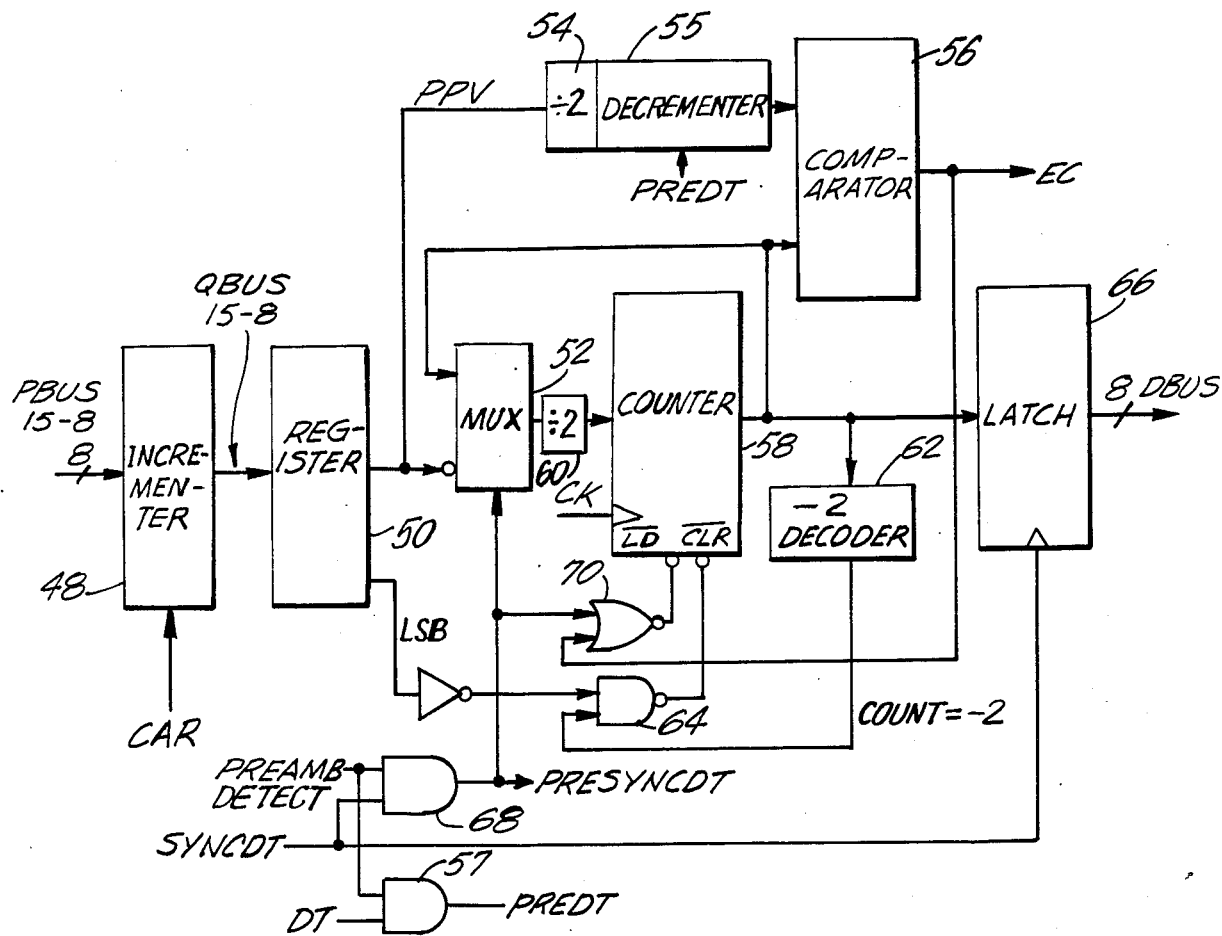
FIG. 3 is a schematic diagram of the zero-crossing counter oscillator of the data separator of FIG. 1.

The SYNCDT pulse is applied as one input to a zero-crossing counter oscillator 14, which, as described in greater detail in FIG. 3, generates an end count or reference clock signal EC, which along with the SYNCDT pulse, is applied to an input of a data regeneration circuit 16, described in greater detail below with reference to FIG. 8. The reference clock signal EC is also applied as an input to data synchronizer 10.

Data regeneration circuit 16 generates the desired separated and synchronized data RDOUT and clock signals RCLK from the EC and SYNCDT signals, as explained below. Data regeneration circuit 16 also generates a data signal DT and a preamble detect signal PREAMB DETECT, which are applied as inputs to counter oscillator 14.

As described in greater detail below, counter oscillator 14 includes an up-down counter that is incremented by the internal clock until its output is equal to the normal period of the half-bit cell. The SYNCDT signal received from the data synchronizer 12 latches the counter value to provide a count or period adjust signal DBUS to a digital low-pass filter 18. The value of the DBUS signal, which represents the required period adjustment, approaches zero as the counter in counter oscillator 14 synchronizes with the relatively constant period input data. The PREAMB DETECT signal from data regeneration circuit 16 is also applied to low-pass filter 18. Low-pass filter 18 and phase corrector 20 are described in greater detail in FIGS. 5 and 6, respectively.

As also described in greater detail below, the digital low-pass filter 18 adds the period adjustment value (DBUS) from counter oscillator 14 to a value stored therein for every input data transition. This stored value represents a weighted average period value that, in effect, remembers previous adjustments made to the period in a manner similar to an analog low-pass filter. The stored value will converge or decrease to zero over time if no input transitions occur. The function of the low-pass filter 18 is to ensure that the normal period of the half-bit cell will contain weighted components provided by the previous period adjustments. The function of the phase corrctor 20 is to provide phase correction to input data when required, such as when the data rate is high.

The FBUS output of the low-pass filter 18 and the SBUS output of the finite phase corrector 20 are applied as inputs to a clamped normal period adjuster 22, which is described in greater detail below with reference to FIG. 7. The output of the low-pass filter 18 is added to a programmable input value, the Data Rate Select, in the normal period adjuster 22. The programmability of the value of the Data Rate Select signal allows one hardware implementation of the data separator to operate at different input data rates. In effect, the Data Rate signal determines the coarse component, whereas the FBUS signal obtained from the low-pass filter 18 determine the fine component of the normal period of the half-bit cell.

The normal period adjuster 22 generates a PBUS signal which is applied as an input to counter oscillator 14 in which the PBUS signal, as described below, is used to set the range of the counter in counter oscillator 14. The PBUS signal is also applied as an input to a fractional period accumulator 24, which, as described below with respect to FIG. 4, generates a carry out signal CAR that is applied to counter oscillator 14 to increase the resolution of the latter without requiring a higher operating clock. Fractional period accumulator 26 also generates a QBUS signal, the most significant bit (MSB) of which is applied as an input to the half bit data synchronizer 10.

Broadly considered, in the data separator of FIG. 1, counter oscillator 14, low-pass filter 18, and normal period adjuster 22 make up a digital implementation of an analog phase-locked loop in which the end of count output or reference clock EC of counter oscillator 14 corresponds to the output of a voltage-controlled oscillator and the DBUS data generated by counter oscillator 14 corresponds to the phase error output of the phase comparator in an analog phase-locked loop.

Figure 9A:
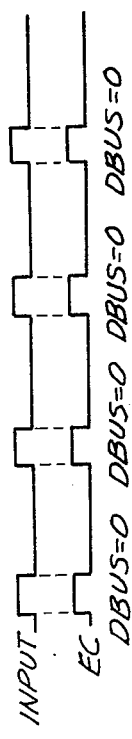
FIGS. 9(a)-(c) are timing diagrams of the input signal and reference clock to provide a better understanding of the operation of the data separator of the invention.
Figure 9B:
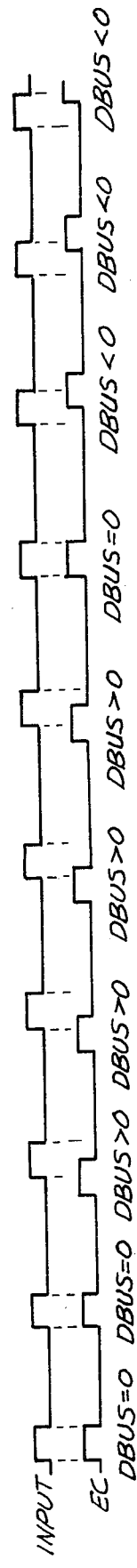

Thus, as shown in FIG. 9(a), when the reference clock EC is synchronized with the input data, as is desired, the value of DBUS is zero. However, whenever there is a variation in the frequency (or period) of the input data, such as to cause the reference clock to become unsynchronized with the input data, the value of DBUS is modified in counter oscillator 14 to cause an adjustment in the relative position of reference clock EC, thereby to cause the latter to become aligned or synchronized with the input data and the value of DBUS to oscillate and incrementally move toward zero at which time synchronization will be again achieved between the reference clock and input data as desired, as shown in FIGS. 9(b) and (c).

Half-Bit Data Synchronizer 10

The half-bit data synchronizer 10 receives the input data RDIN at the clock input of a flip-flop 30, which converts the rising edge of the RDIN signal to level form. The Q terminal of flip-flop 30 is connected to its D terminal and to the D terminal of a flip-flop 32, which delays the signal by one-half clock. The Q output of flip-flop 30 and the Q terminal of flip-flop 32 are connected respectively to the 0 and 1 inputs of a multiplexer 34.

The output of multiplexer 34, which is either the normal or delayed data, is applied to a level change detector made up of flip-flops 36 and 38 and exclusive OR gate 40, the inputs of which are respectively connected to the Q terminals of the flip-flops 36 and 38. The output gate 40 is the synchronized data single SYNCDT.

The control signal for the multiplexer 34 is derived from QBUS7 the most significant bit (MSB) of the signal produced in fractional period accumulator 26. The true and inverted values of the QBUS7 signal are respectively applied to one input of each of AND gates 42 and 44, which receive the reference clock EC at their other input. The outputs of gates 42 and 44 are respectively applied to the J and K terminals of a flip-flop 46. The output of flip-flop 46 at its Q terminal is the control signal for multiplexer 34.

This arrangement will cause the synchronized data SYNCDT to move back and forth by half a clock according to the truncated size (to the half clock) of each half bit cell. In effect, this permits half-bit cell window resolution with half clock accuracy without increasing the clock rate.

Zero-Crossing Counter Oscillator 14

The input to the zero-crossing counter oscillator 14 is made up of bits 15-8 of PBUS, which, as described below, is the modified or adjusted value of the DBUS signal produced by the counter oscillator 14. This 8-bit signal is stored in a register incrementer 48 to which may be added the carry signal CAR derived, as described below, in the fractional period accumulator 26. The adjusted PBUS signal, designated QBUS, is applied for each half bit to a register 50. The output of register 50, which represents the digital value of the present period (PPV), is applied to an inverting input of a multiplexer 52 and to a divide-by-two circuit 54. The output of the latter is decremented in a decrementer 55 by the PREDT signal from the output of AND gate 57. The output of divider 54 is applied to one input of a comparator 56.

The output of multiplexer 52 is applied to a divide-by-2 circuit 60. The output of the latter is applied to a zero-crossing counter 58, which is preferably in the form of an 8-bit binary up-down counter. The output of counter 58 is applied to the other input of comparator 56 and back to the other (non-inverting) input of multiplexer 52. The output of the counter 58 is also applied to a decoder circuit 62 the output of which goes active (high) when the counter output equals 2. The count=2 output is applied to one input of a NAND gate 64, the output of which is applied to the clear CLR input of counter 58. The other input to gate 64 is the inverted bit 8 of the signal from register 50. The output of the counter 58 is captured in latch circuit 66, which is triggered by the SYNCDT signal from data synchronizer 10. That signal is also applied to one input of an AND gate 68, which also receives the PREAMB DETECT signal as does the other input to AND gate 57.

The output of gate 68, which is the PRESYNCDT signal, is applied as the control signal for multiplexer 52, and to one input of a NOR gate 70. The other input to gate 70 is the reference clock EC. The output of gate 70 is applied to the LD (load) input of counter 58. The value of bits 15-8 of the PBUS signal produced by the normal period adjuster 22 is the integer part of the desired or nominal period of the half-bit cell. This value may or may not be incremented dependent on the value of the carry signal CAR from the fractional period accumulator 26, which prevents the loss of the fractional portion of the period value. This value of PBUS is transferred into register 50 each half bit cell. This value, which is stored in register 50 and represents the present period value, is applied to counter 58 through multiplexer 52 when the EC signal is generated and is effective to directly control the period of the counter during normal operation, that is, when the PRESYNCDT signal is not active.

In a preferred embodiment, counter 58 counts in 2's complement notation from $-128$ to $+127$ in increments of 1 for each input clock pulse until it is loaded by the end count signal EC or during sync detect by the PRESYNCDT signal at the output of NOR gate 70. Counter 58 then proceeds to increment from this newly loaded value.

The end count signal EC is produced by comparator 56 when its two inputs are equal, that is, when the output of the counter 58 is equal to one half the output of register 50, the present period value or one half the bit cell. This value is generated by shifting down (dividing by two) the output of the register 50 and possibly decrementing by 1. At that time counter 58 is preloaded with the value of $\frac{1}{2}$ the present period value (PPV) by inverting at the input of the multiplexer and shifting down the value in register 50.

A zero-crossing counter (ZCC) is preferably used as the counter 58 because the zero count is located in the middle part of the counter's counting sequence. This allows a 50 per cent correction to be made by a one-bit shift downward in the count in the counter. Ideally, counter 58 should be symmetrical about zero. As shown in the following example, this may be accomplished by simulating the behavior of a two's complement counter through the use of a count=2 decoder 62. The resultant counting sequence is then normalized by the normal period adjuster 22 to yield the required continuous counting sequence that is synmmetrical about zero.

EXAMPLE 1A: Zero=Crossing Counter Oscillator Count=8

| PPV | = 0 0 0 0 0 1 1 1 |
|---|---|
| PPV Inverted | = 1 1 1 1 1 0 0 0 |
| PPV Inverted/2 | = 1 1 1 1 1 1 0 0 |

| | ZCC Counting Sequence | EC |
|---|---|---|
| PPV/2 | | |
| 0 0 0 0 0 0 1 1 | 1 1 1 1 1 1 0 0 | 0 |
| | 1 1 1 1 1 1 0 1 | 0 |
| | 1 1 1 1 1 1 1 0 | 0 |
| | 1 1 1 1 1 1 1 1 | 0 |
| | 0 0 0 0 0 0 0 0 | 0 |
| | 0 0 0 0 0 0 0 1 | 0 |
| V | 0 0 0 0 0 0 1 0 | 0 |
| 0 0 0 0 0 0 1 1 | 0 0 0 0 0 0 1 1 | 1 |
| | 1 1 1 1 1 1 0 0 | 0 |

The resulting count is asymmetrical about zero with four negative counts and three positive counts. The counting sequence is normalized in the normal period adjuster 22 where the:

$-4, -3, -2, -1, 0, 1, 2, 3$ sequence is converted to:

$-3, -2, -1, 0, 0, 1, 2, 3$

EXAMPLE 1b: Zero=Crossing Counter Oscillator Count=7

| PPV | = 0 0 0 0 0 1 1 0 |
|---|---|
| PPV Inverted | = 1 1 1 1 1 0 0 1 |
| PPV Inverted/2 | = 1 1 1 1 1 1 0 0 |

| | ZCC Counting Sequence | EC |
|---|---|---|
| PPV/2 | | |

-continued

```
00000011    11111100    0
            11111101    0
            11111110    0
            00000000    0
            00000001    0
     V      00000010    0
00000011    00000011    1
            11111100    0
```

As shown by this example, the −2 count is skipped when the output of decoder 62 is active high and the LSB of register 50 is low. The resulting count is symmetrical about zero with three negative counts and three positive counts. The counting sequence is normalized in the normal period adjuster 22 where the:

−4, −3, −2, 0, 1, 2, 3 sequence is converted to:

−3, −2, −1, 0, 1, 2, 3

An additional reason for the use of a zero-crossing counter is to allow for instant phase error detection implementation. As shown in FIG. 3, the synchronized read data signal SYNCDT applied to the clock input of latch 66 causes the latter to latch the value stored in counter 58, which is already in 2's complement form. This latched data, which is the error signal DBUS, is latched upon the receipt of a synchronized input data SYNCDT at the clock terminal of latch 66, and the DBUS error signal is then ready for period or additional phase correction as described below.

The PREDT and PRESYNDT signals work together and allow the ZCC to make an immediate and large phase correction when the PREAMB DETECT signal is active (i.e. when the data SYNC field has been detected in the data regeneration circuit 16.

```
                          PRESYNCDT
 −7  −6  −5  −4  −3  −2  −1   0   1   2   3   4   5   6   7
                  ZCC COUNTER (OLD)
                                         V
     −7  −6  −6  −4  −3  −2  −1   0   1   2   3   4   5
                  ZCC COUNTER (NEW)
                                         V
     −6  −5  −4  −3  −2  −1   0   1   2   3   4   5
                  ZCC COUNTER (EFFECTIVE)
```

The PRESYNCDT data signal, which controls the operation of the multiplexer 52 and loads the counter 58, is generated by AND gate 68. The PRESYNCDT signal will cause counter 58 to immediately load half of its present value through multiplexer 52. As shown in the diagram above, this will cause an immediate 50 percent phase correction to counter 58 changing the count from ZCC counter (old) to ZCC counter (new). The loading of counter 58 requires one clock cycle. In this example, the uncorrected counter 58 would have advanced to the count of 5 during this clock cycle. To operate correctly, the new divided by two value of counter 58 has to be incremented by one to compensate for the lost clock cycle. The present implementation effectively increments the count value by generating the EC signal one clock early. The EC signal is generated earlier because the one half present period value generated by divide-by-two circuit 54 is decremented in decrementer 55 by the PREDT signal obtained from AND gate 57 yielding the ZCC counter (effective) value.

In the present implementation, divide-by-two circuits 54 and 60 are constructed with binary shift registers.

The phase corrections that result for both the case when QBUS bit 8, the LSB from register 50, is zero (QBUS even) or one (PBUS odd) are:

| QBUS even | |
|---|---|
| counter 58 value: | −4 −3 −2 −1 0   1   2   3 |
| next value: | −2 −2 −1 −1 0   0   1   1 |
| effective correction: | +2 +1 +1   0 0 −1 −1 −2 |
| QBUS odd: | |
| counter 58 value | −4 −3 −2 0   1   2   3 |
| next value: | −2 −2 (0) 0   0   1   1 |
| effective correction: | +2 +1 +1 0 −1 −1 −2 |

Figure 9C:
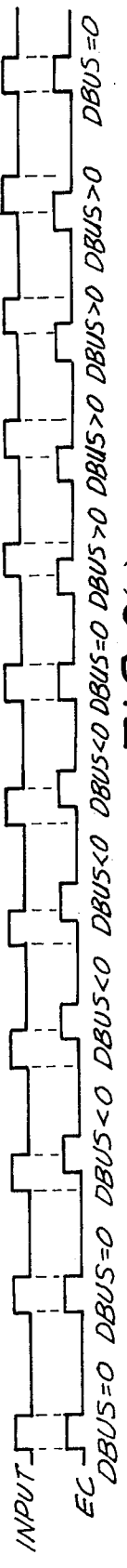

From the foregoing, it can be understood that if the received data pulse is centered in the data window or half bit cell, as defined by the EC signal produced by comparator 56, the value in counter 58 and in latch 66 will be zero when the SYNCDT signal is generated. If the data pulse is moved away from the center of the data window as a result, for example, of jitter or a change in motor speed, the value in the counter 58 will be greater than or less than zero by an amount proportional to the variation in the input data pulse. That value as latched into latch 66 is the DBUS signal which represents the error in the position of the input data pulse. This value will be used in determining the correction to the EC reference clock that is required, as shown in FIGS. 9a, 9b, and 9c.

Fraction Period Accumulator 26

Figure 4:
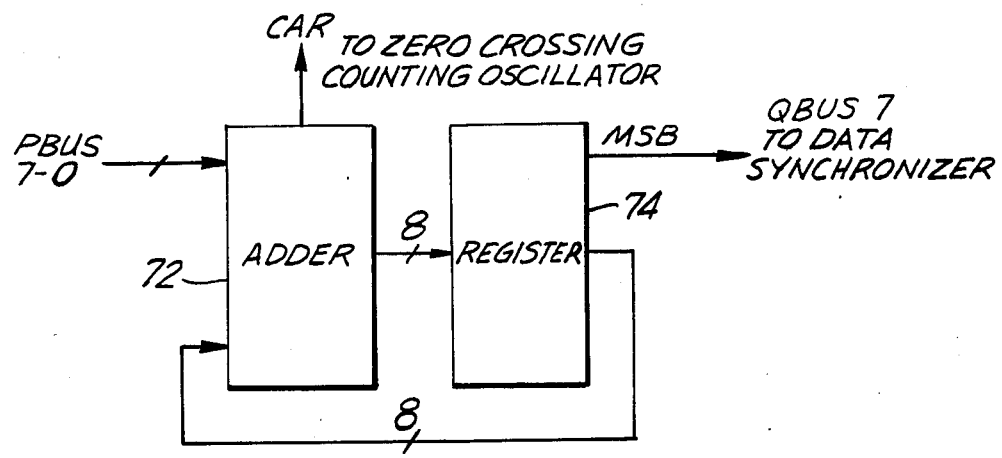
FIG. 4 is a schematic diagram of the fraction period accumulator of the data separator of FIG. 1.

As shown in FIG. 1, the fractional part of the normal period value (PBUS bits 7-0) is applied to the input of the fraction period accumulator 26. As shown in FIG. 4, those bits are applied to one input of an adder 72. The output of adder 72 is applied to a register 74 and the register output is connected back to the other input of the adder.

The output of the adder 72 is the carry signal CAR which, as noted above, is applied to the incrementer 48 in counter oscillator 14 to increment the integer part (bits 15-8) of the present period value that is latched into register 50 by 1 when the CAR signal occurs.

This logic allows a greater resolution of the present period value than would otherwise be obtainable at the operating clock rate. For example, if, as in the embodiment herein described, 8 bits are chosen for fraction period computation, the logic system consisting of the counter 58 and the fraction period accumulator 26 has the ability to count the desired period value with a maximum phase error of one clock over a maximum of 16 bytes (256 half bit cell times). If no fractional period accumulator was used, the counter 58, register 50, comparator 58 and other associated logic in the zero crossing counter oscillator 14 would have to operate on a bigger word (greater than 8 bits). The use of the fractional period accumulator allows the required accuracy with only an 8-bit counter. If a larger counter were used, the operating frequency would have to be increased to allow the wider counter to reach its full range in the bit cell time. The most significant bit (MSB) of the output of the register 74 is the QBUS7 signal, which, as noted above, is applied to the data synchronizer 10.

Linear Converging Low-Pass Filter 18

Figure 5:
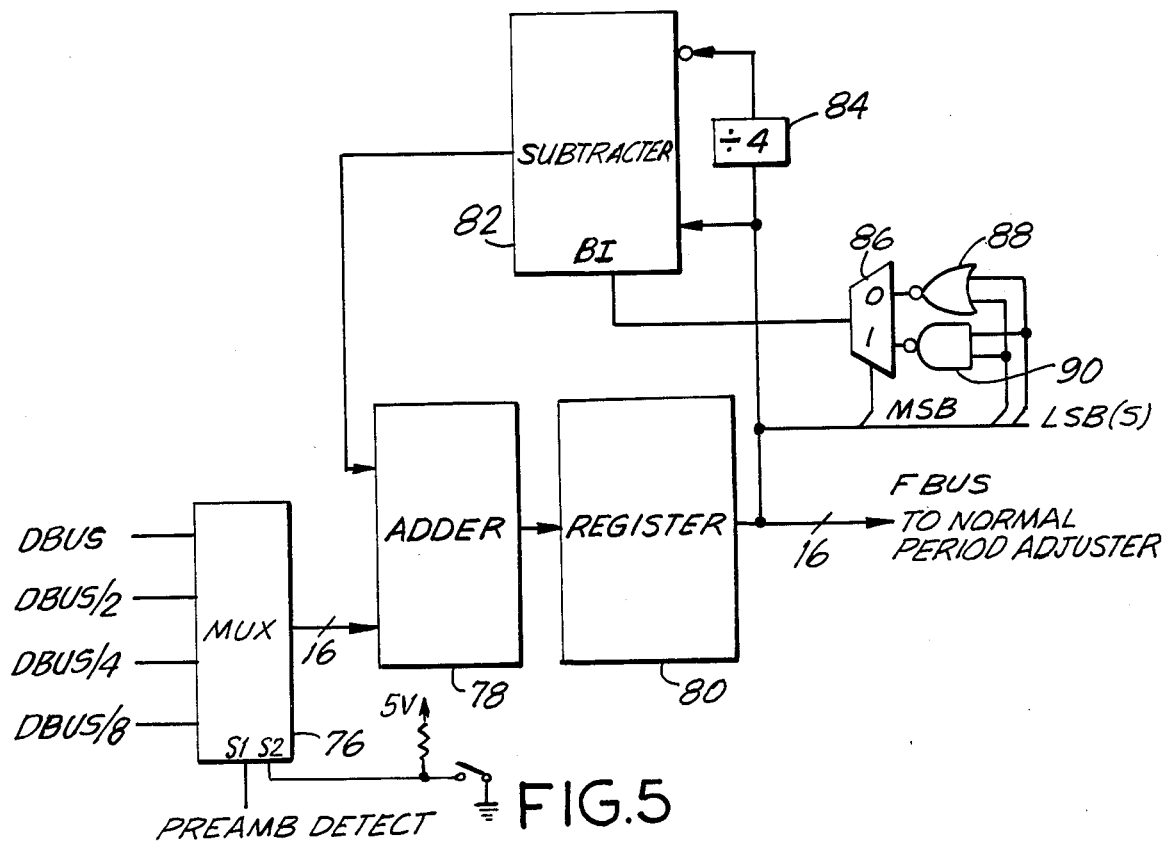
FIG. 5 is a schematic diagram of the linear converging low-pass filter of the data separator of FIG. 1.

The DBUS error signal is applied to the low-pass filter 18, illustrated in FIG. 5, which operates on the DBUS signal in a manner that is analogous to that of an analogue low-pass filter in an analog phase-locked loop. As shown in FIG. 5, the bits of the DBUS signal from the counter oscillator 14 are applied as inputs to a multiplexer 76 which is controlled by the PREAMB DETECT signal obtained from the data regeneration circuit 16.

The DBUS signal is passed through mutliplexer 76 to the inputs of an adder 78, the output of which is applied to a register 80. The output of register 80, which is the FBUS signal, is applied to one input of a subtractor 82 and to an inverting input of the subtractor through a divide-by-four circuit 84. The output of the subtractor 82 is applied to the other input of the adder 78. The borrow signal to the subtractor is obtained from a multiplexer 86, which receives inputs from NAND gate 88 and NOR gate 90, which, in turn, receive the least significant bits of the FBUS signal at their other inputs. If FBUS is a negative number (the MSB=1) then multiplexer 86 passes the output of NAND gate 90 to the BI (Borrow In) input of subtractor 82. If FBUS is positive (the MSB=0) then multiplexer 86 passes the output of NOR gate 88 to the BI input of subtractor 82. This will cause the output of subtractor 82 to converge to zero for FBUS positive and −1 for FBUS negative (−1 will be changed to zero as described in the normal period adjuster 22.)

It will be understood that the value of FBUS stored in register 80 can be made to converge to zero by subtracting a fixed percentage of itself for each half bit cell. Stated differently, the value stored in register 80 will have what may be considered a "time" effect (i.e., over a series of bit cells) on the computation of the value of the period. To this end, ¼ of the value stores in register 80 is subtracted from itself in subtractor 82 and applied to one input of adder 78. The value of the DBUS signal, through the gain control multiplexer 76, is added to the processed value applied to the other input of Adder 78 and for each transition in a bit cell; there is no addition if there is no data transition in the bit cell.

Finite Phase Corrector 20

Figure 6:
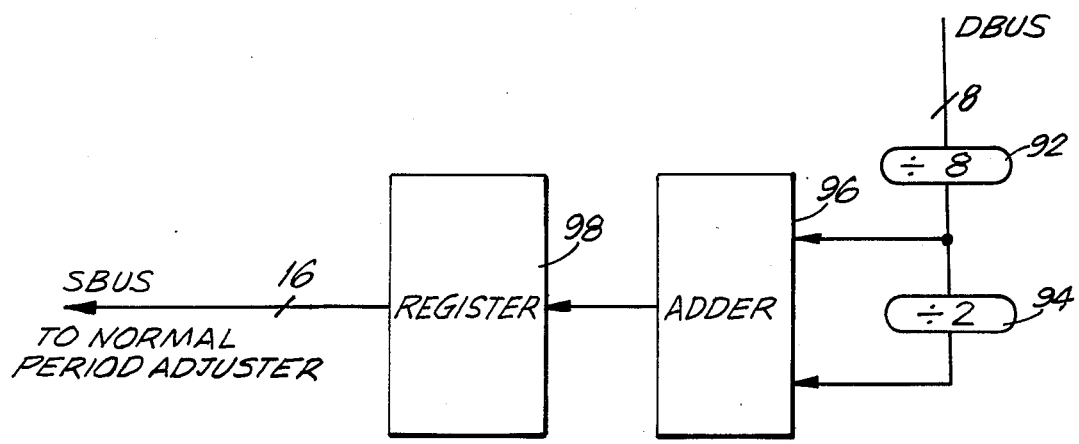
FIG. 6 is a schematic diagram of the finite phase corrector of the data separator of FIG. 1.

Finite phase corrector 20, as shown in FIG. 6, receives the DBUS signal and passes it through a divide-by-eight circuit 92 and a divide-by-two circuit 94. The outputs of circuits 92 and 94 are summed in an adder 96 and passed to a register 98. The output of register 98 is the SBUS signal, which is applied as one input to the normal period adjuster 22.

Finite phase corrector 20 may be included in the data separator of the invention to perform minor phase correction for each data transition in order to keep in synchronization with the input data. If no finite phase correction is needed the value of SBUS may be forced to zero. For low data rates the output of finite phase corrector 20 will approach zero.

Normal Period Adjuster 22

Figure 7:
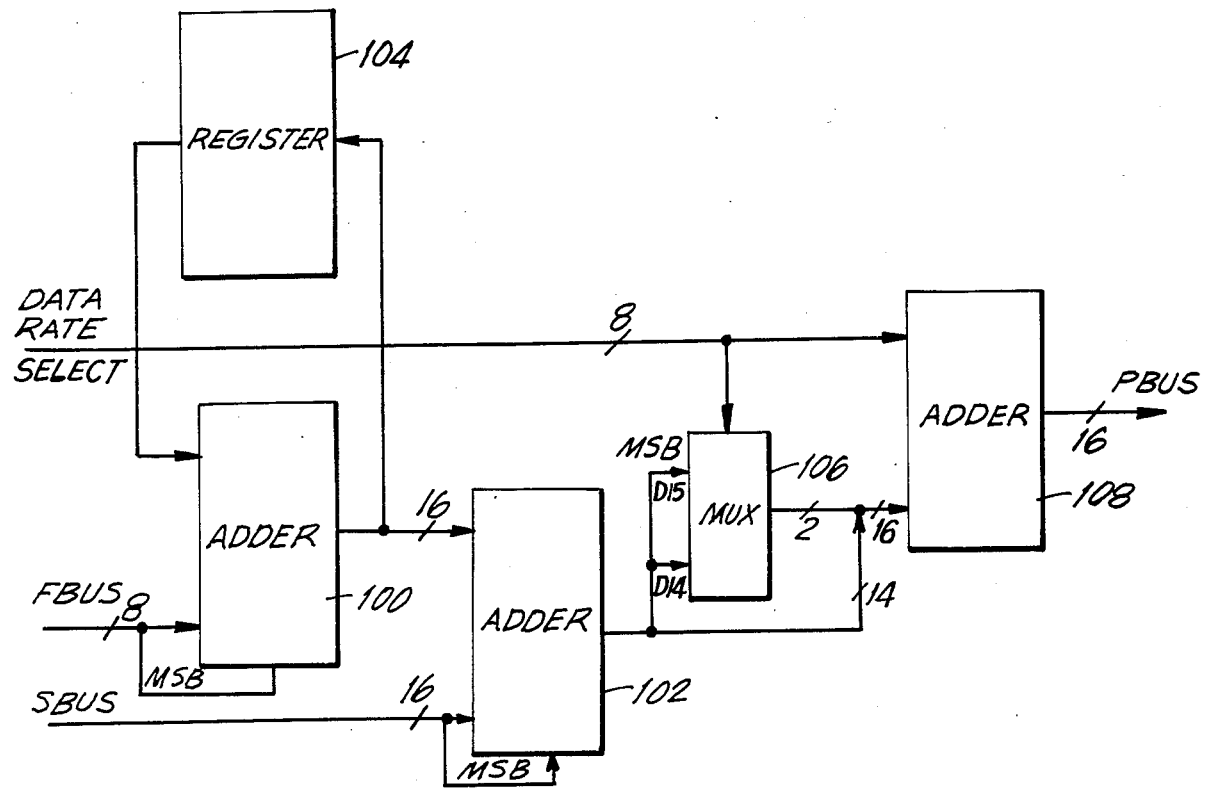
FIG. 7 is a schematic diagram of the normal period adjuster of the data separator of FIG. 1.

The normal period adjuster 22, as illustrated in FIG. 7, receives the FBUS signal from the low pass filter 18 at one input of an adder 100 and the SBUS signal from the finite phase corrector 20 at one input of an adder 102. The output of adder 100 is added to the other input of adder 102 and applied to the input of register 104, the output of which is applied to the other input of adder 100.

The two MSB outputs of adder 102 are applied to the inputs of a multiplexer 106. The remaining outputs of adder 102 and the output of multiplexer 106 are applied to the input of an adder 108, the output of which is the FBUS or normal period signal. The other input to adder 108 is a Data Rate Select signal, one bit of which is also applied as the control signal to multiplexer 106. The Data Rate Select signal is a binary signal programmed by the user that represents the rate of the input data to the data separator.

Figure 10A:
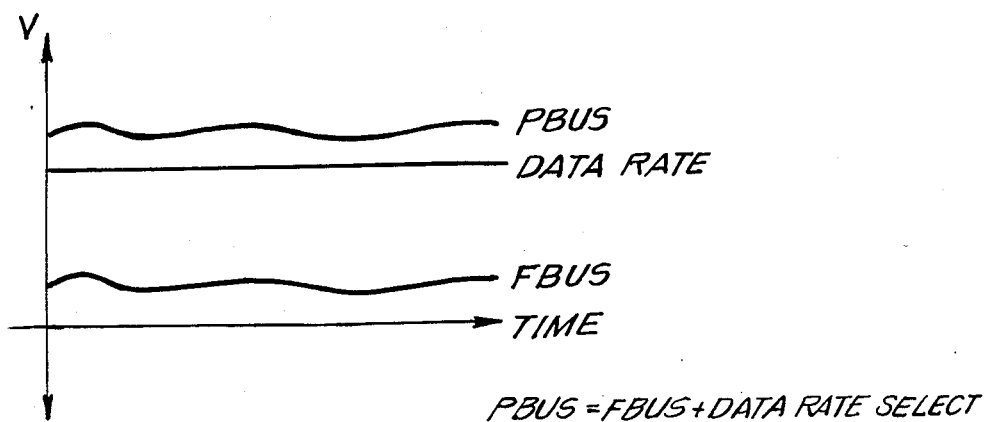
FIGS. 10(a) and 10(b) are waveforms of the normal period value (PBUS) signals for use in understanding the operation of the data separator of the invention.
Figure 10B:
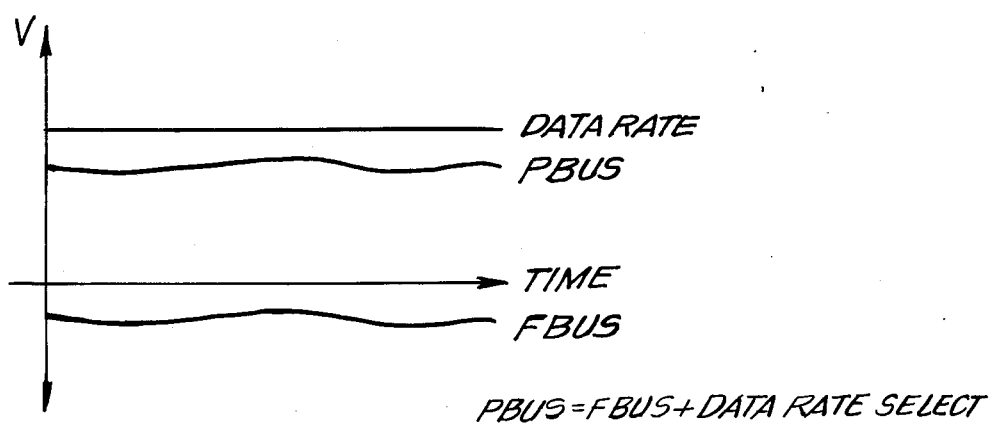

It will be understood that the FBUS signal represents the filtered immediate period variation which increases or decreases the period conversion value stored in register 104 every half bit cell. The normal period value FBUS is thus the sum of the Data Rate Select, FBUS and SBUS signals, as shonw in FIGS. 10a and b.

The values of the two MSBs at the output of adder 102 are applied to multiplexer 106. The output of multiplexer 106 is applied to the input of adder 108 such that multiplexer 106 provides hardware control, as shown, so that the value at this input of adder 108 will not be greater than +/− a predetermined number, which typically would be +/−6 per cent of the programmed data rate. This will prevent the digital phaselock loop from overreacting at extreme conditions, such as power-on or reading with noisy data, which could cause the unclamped phase-locked loop out of its lock range.

As can be seen in FIG. 7, and as described in the description of zero-crossing counter oscillator 14, the difference or error value DBUS derived from the zero crossing counter oscillator 14 is compensated in the normal period adjuster 22 by tying the carry in of adder 100 to the most significant bit (MSR) of the FBUS signal. This arrangement causes all negative numbers to be incremented by 1, which, in turn, results in a phase value symetrical about zero. A similar circuit is, as shown, employed in the carry in of adder 102 for SBUS value mapping.

Data Regeneration Circuit 16

Figure 8:
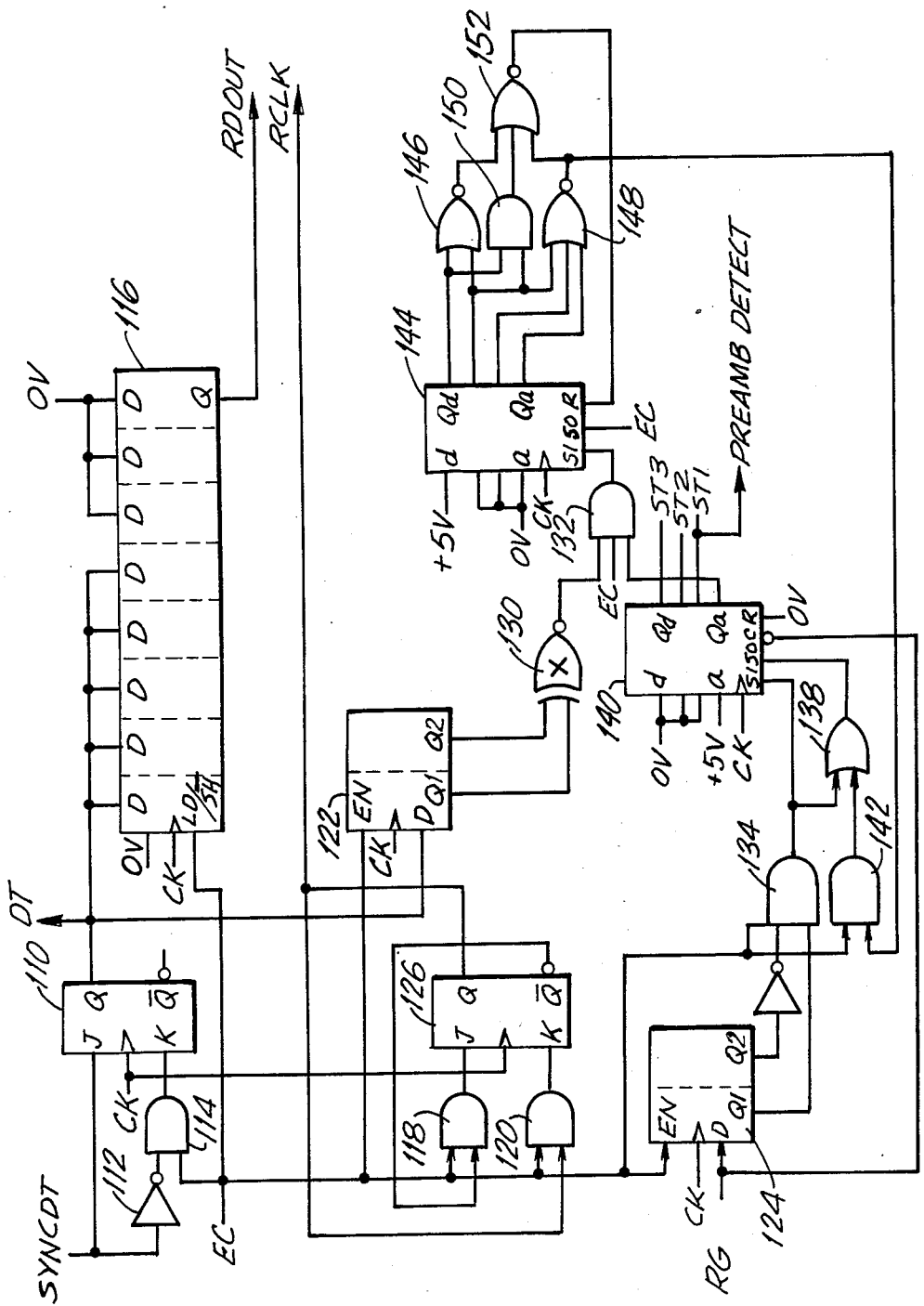
FIG. 8 is a schematic diagram of the data regenerator of the data separator of FIG. 1.

The data regeneration circuit 16, as shown in FIG. 8, receives the SYNCDT signal from the data synchronizer 10 at the input of a flip-flop 110. The SYNCDT signal is also inverted in an inverter 112 and applied to one input of an AND gate 114. The end count signal EC is applied to the other input of AND gate 114 and to the load/shift input of a shift register 116. The output of AND gate 114 is applied to the K input of flip-flop 110. The Q output of the last stage of the shift register 116 is the regenerated data signal RDOUT.

The end count signal EC is also applied to one input of AND gates 118 and 120 and to the EN inputs of flip-flops 122 and 124. The output of AND gates 118 and 120 are respectively applied to the J and K inputs of a flip-flop 126. The output at the Q terminal of flip-flop 126, which is the regenerated clock RCLK, is connected to the second input of AND gate 120, whereas the inverted output at the Q terminal is connected to the second input of AND gate 118.

The signal at the Q terminal of flip-flop 110 is the DT data signal, which is applied to the counter oscillator 14 and also to the D input of two-bit shift register 122. The outputs at the Q1 and Q2 terminals shift register 122 are connected at the inputs of an exclusive-NOR gate 130, the output of which is applied to one input of an AND gate 132.

The output at the Q1 terminal of two-bit shift register 124 is connected to one input of an AND gate 134, which receives at its other input the inverted output of the Q2 terminal shift register 124. The output of AND gate 134 is applied to one input of an OR gate 138 and to the S1 input of a shift register 140. The end count signal EC is applied to a third input of AND gate 134 and to one input of AND gate 142, the output of which is applied to the second input of OR gate 138. A read gate RG signal is applied to the D input of flip-flop 124 and to the clear C input of shift register 140.

The output of the Qa terminal of shift register 140 is applied to a second input of AND gate 132, which also receives the end count signal EC at its third input. The output of AND gate 132 is applied to the S1 terminal of a shift register 144, which further receives the end count signal EC at its S0 terminal. The Qb output of register 140 constitute the PREAMB DETECT signal.

The output stages of shift register 144 are connected, as shown in FIG. 8, to the inputs of NOR gates 146 and 148 and an AND gate 150. The outputs of these gates are applied as the inputs to a NOR gate 152, the output of which is connected to the R terminal of shift register 144. The output of NOR gate 148 is connected to the second input of AND gate 142.

In operation, the data regeneration circuit 16 generates the read clock RCLK and read data RDOUT signals from the synchronized RDIN data (SYNCDT) and the end count or reference clock signal EC. The data generation shift register 116 places a RDOUT pulse in the middle of a RCLK window when the EC signal loads register 116 after the SYNCDT signal has forced the DT signal high.

The logic portion of the data regeneration circuit that performs the PREAMB DETECT function looks for a series of equally spaced SYNCDT pulses when input read gate RG signal is high. When RG is low, shift register 140 will be held in the reset condition. The transition of RG from low to high will parallel load shift register 140, thereby to cause the Preamble Detect signal to go to zero.

When the Qa output of register 140 goes high it enables the initialization of the random walk counter composed of shift register 144, NOR gates 146, 148, 152, and AND gate 150, which is then held in the parallel load state until the output of exclusive-NOR gate 130 goes low. Shift register 122 outputs will cause gate 130 to go low when a steady OOH data pattern, such as the disk VCO sync field, resulting in an alternating 1, 0 RDOUT pattern, is encountered. This will allow shift register 144 to increment once for each EC pulse. Shift register 144 will reach its terminal count after it receives 18 EC pulses if no data pulses are encountered. Shift register 144 will then allow register 140 to shift and thereby cause the PREAMB DETECT signal to go high.

What is claimed is:

1. A digital data separator for deriving separated data and clock signals from an input encoded data stream that includes data and clock pulses, said data separator comprising a source of clock pulses, means for synchronizing each input data pulse with one of said clock pulses to generate synchronized data pulses, a counter coupled to said clock source, the count in said counter being incremented by said clock pulses until its count equals a predetermined period, latch means coupled to said counter and effective upon the receipt of one of said synchronized data pulses to store therein the value of said counter, said count value representing the required period adjustment, signal means coupled to said latch means for digitally processing said period adjustment signal and for deriving a digital signal representing the previous period, comparator and logic means having first and second inputs operatively respectively coupled to the outputs of said counter and said processing means for producing a reference clock signal when the output of said counter is a present ration of said previous period signal, and a data regeneration circuit operatively coupled to the output of said comparator and logic means for generating separate data and clock signals in response to said reference clock signal and synchronized data signals.

2. The data separator of claim 1, in which said processing means includes a low-pass filter and a finite phase corrector each receiving said period adjustment signal, and means for logically combining the outputs of said low-pass filter and said finite phase adjuster and a preselected data rate signal and for generating a normal period value signal.

3. The data separator of claim 2, further comprising a fractional period accumulator receiving the least significant bits of the period value signal for producing a carry signal, and means for incrementing said carry signal to the most significant bits of the period value signal.

4. The data separator of claim 1, in which said counter is a zero-crossing counter symmetrical about zero.

* * * * *